United States Patent

Ebrahimi Afrouzi et al.

(10) Patent No.: US 10,882,186 B1
(45) Date of Patent: Jan. 5, 2021

(54) METHOD FOR EFFICIENT OPERATION OF MOBILE ROBOTIC DEVICES

(71) Applicants: Ali Ebrahimi Afrouzi, San Jose, CA (US); Chen Zhang, Dublin, CA (US)

(72) Inventors: Ali Ebrahimi Afrouzi, San Jose, CA (US); Chen Zhang, Dublin, CA (US)

(73) Assignee: AI Incorporated, Toronto (CA)

( * ) Notice: Subject to any disclaimer, the term of this patent is extended or adjusted under 35 U.S.C. 154(b) by 310 days.

(21) Appl. No.: 15/976,853

(22) Filed: May 10, 2018

Related U.S. Application Data (60) Provisional application No. 62/505,060, filed on May 11, 2017.

(51) Int. Cl.
*B25J 9/16* (2006.01)
*B25J 11/00* (2006.01)

(52) U.S. Cl.
CPC .......... *B25J 9/1666* (2013.01); *B25J 11/0085* (2013.01); *Y10S 901/01* (2013.01); *Y10S 901/02* (2013.01)

(58) Field of Classification Search
CPC .... B25J 9/1666; B25J 11/0085; Y10S 901/02; Y10S 901/01
USPC .................................................. 700/245, 255
See application file for complete search history.

(56) References Cited

U.S. PATENT DOCUMENTS

| | | | |
|---|---|---|---|
| 5,293,955 A | 3/1994 | Lee | |
| 6,594,844 B2 | 7/2003 | Jones | |
| 7,155,308 B2 | 12/2006 | Jones | |
| 7,430,455 B2 | 9/2008 | Casey et al. | |
| 10,168,709 B2* | 1/2019 | Kleiner | G05D 1/0219 |
| 10,310,507 B2* | 6/2019 | Kleiner | A47L 9/2852 |
| 2005/0010331 A1 | 1/2005 | Taylor et al. | |
| 2013/0184980 A1* | 7/2013 | Ichikawa | B25J 9/1676 701/301 |
| 2014/0207281 A1* | 7/2014 | Angle | H04L 12/282 700/257 |
| 2016/0309973 A1* | 10/2016 | Sheikh | A47L 11/4044 |
| 2017/0049288 A1* | 2/2017 | Knutson | A47L 11/4036 |
| 2017/0192435 A1* | 7/2017 | Bakhishev | G05D 1/028 |
| 2018/0074508 A1* | 3/2018 | Kleiner | A47L 9/0488 |
| 2018/0211103 A1* | 7/2018 | Sohn | G05D 1/024 |
| 2018/0284786 A1* | 10/2018 | Moshkina-Martinson | G05D 1/024 |
| 2018/0311822 A1* | 11/2018 | Kaminka | B25J 5/005 |
| 2019/0320867 A1* | 10/2019 | Noh | B25J 9/1664 |
| 2020/0047337 A1* | 2/2020 | Williams | B25J 9/163 |
| 2020/0047343 A1* | 2/2020 | Bal | B25J 9/1666 |

\* cited by examiner

*Primary Examiner* — Jaime Figueroa (57) ABSTRACT

A method for efficient navigational and work duty planning for mobile robotic devices. A mobile robotic device will autonomously create a plan for navigation and work duty functions based on data compiled regarding various considerations in the work environment. These factors include what type of work surface is being operated on, whether dynamic obstacles are present in the work environment or not and the like factors.

20 Claims, 5 Drawing Sheets

METHOD FOR EFFICIENT OPERATION OF MOBILE ROBOTIC DEVICES

CROSS-REFERENCE TO RELATED APPLICATIONS

This application claims the benefit of provisional application Ser. No. 62/505,060, filed May 11, 2017 by the present inventor.

FIELD OF INVENTION

The present invention relates to mobile robotic devices generally and more specifically to how mobile robotic devices operate in a work environment.

BACKGROUND

Sensory detection is important for mobile robotic devices. Mobile robotic devices must be able to detect obstacles in order to avoid running into them resulting in damage to the obstacle or the device itself. Several inventions exist to demonstrate obstacle detection and obstacle avoidance. Additionally, changes in surface type that a mobile robotic device can impact the functions for the robot. For example, a robot may not be able to operate effectively on a particular type of surface. Alternatively, surface types may impact the functions a robot can partake in. However, inefficiencies remain. A need exists for mobile robotic devices to be able to autonomously plan the most efficient work operational plan through a work environment that incorporates considerations regarding the status of the work environment itself.

SUMMARY

The following present a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

The present invention introduces a method for mobile robotic devices to autonomously make decisions regarding the most efficient navigational and work duty plan for a work environment. Considerations regarding dynamic obstacles, the type of work surfaces present, and other relevant considerations are factored into this decision making. The mobile robotic device will process probabilities and all collected data regarding the work environment in order to create the most efficient plan of operation for a work environment.

BRIEF DESCRIPTION OF DRAWINGS

Non-limiting and non-exhaustive features of the present invention are described with reference to the following figures, wherein like reference numerals refer to like parts throughout the various figures.

DETAILED DESCRIPTION OF THE INVENTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In still other instances, specific numeric references such as "first material," may be made. However, the specific numeric reference should not be interpreted as a literal sequential order but rather interpreted that the "first material" is different than a "second material." Thus, the specific details set forth are merely exemplary. The specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

The term "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

The term "dynamic obstacle" shall hereinafter mean obstacles in a work environment that were not present in a prior operating cycle but are now present in a current operating cycle as well as obstacles that are present in a current operating cycle that were not present previously. Further dynamic obstacle will be intended to mean any and all obstacles that are moving at the time of operation including but not limited to pets, humans, other mobile robotic devices and the like. Additionally, obstacles which are invisible to the robot will also be included as dynamic obstacles including but not limited to obstacles that appear or disappear in regards to the mobile robotic device's sensors such as infrared, depth camera or any other sensor type included with the robot and the like.

A method for decision making for mobile robotic devices is disclosed. During operation, utilizing machine learning, a mobile robotic device will process probabilities in autonomously determining where the mobile robotic device should operate as well as what operations should be partaken in. Information pertaining to work surface types as well as the presence or absence of dynamic obstacles in work areas are some, but not all of the considerations utilized in making these decisions. Utilizing data from prior work cycles a mobile robotic device will come up with a navigational plan as well as a plan for work duties to be conducted. The mobile robotic device's plan will factor in various considerations in order to come up with the most efficient navigational and work plan for conducting work duties. While performing work duties, sensors on the mobile robotic device will collect new data. If the data requires the mobile robotic to alter its work and navigational plan, it will do so and store the new data for future use.

In the present invention dynamic obstacles and floor type are detected by the mobile robotic device during work operation. As the mobile robotic device operates in the work environment, sensors arranged on the mobile robotic device will collect information such as what type of work surface is being operated on. For instance, for mobile robotic devices which clean, for example a mobile robotic cleaning device, what type of work surface is being operated on can be quite important. For example, if a room has a thick pile rug as well as wood flooring, then this information is important for the operation of the mobile robotic cleaning device. In such a situation the presence of two differing work surfaces may make the operation of the mobile robotic cleaning device difficult as it has to adjust itself when it transitions from the taller elevation rug to the lower elevation wood floor. Additionally, the type of cleaning in such a situation may be different. For example, the cleaning on rug versus the cleaning on a wood floor may require different functions and may even elevate the pressure on the robot. For example, when a mobile robotic cleaning device operates on a rug, it may require a higher suctioning power or the brush may need to spin faster than when it is cleaning on a wood floor. Since debris can become stuck deep in the rug higher suctioning power may be necessary over that of a wood floor. Alternatively, a mobile robotic cleaning device that can vacuum as well as mop would result in different functions based on the floor type as the mobile robotic cleaning device is not going to mop the carpet. Additionally, a user may not wish for a mobile robotic device to operate on certain floor types. Take for example a mobile robotic device that enters the home to deliver packages. A user may wish for such a mobile robotic device to only operate on a tiled surface but not that of a carpeted floor as the mobile robotic device would potentially track in dirt from outside and tile is easier to clean than carpet.

In embodiments, as the mobile robotic device traverses the work environment it will take note of what type of work surfaces are in the work environment it is operating in and where those work surfaces are located. The device will access this information during a live work cycle in order to assist with decision making on the part of the mobile robotic device. In order to maximize the efficiency of a work operation for the mobile robotic device, the mobile robotic device will autonomously determine probabilities based on data it has collected over time regarding the work surface types in rooms and what rooms it should operate in in order to maximize operational efficiency. For example, for a mobile robotic cleaning device, the mobile robotic cleaning device may determine that it is more efficient to clean the bedrooms first as they consist of a single work surface type, for example a carpeted surface, while other rooms contain multiple types of work surfaces and that transitioning between multiple surface types would be burdensome and time consuming for the mobile robotic cleaning device. Further, in a similar situation, a mobile robotic cleaning device may determine that it should clean a hallway first as it consists of a wood floor and the wood floor can be cleaned quicker than rooms where the floor consists solely of carpet. Rooms with multiple floor types are burdensome for the mobile robotic device. For example, for devices such as mobile robotic cleaning devices, operating in a room with multiple floor surface types is burdensome for the robot because it must transition itself between different surface types resulting in different functionality, physically putting pressure on the robot, as well as lowering battery efficiency. As it traverses each edge or boundary from one surface type to another a mobile robotic cleaning device may need to switch the amount of power it is utilizing to clean the different surface types for example by increasing suction power or brush rotation speed thereby wasting time and energy each time it transitions. Further, it may impact the angle of the mobile robotic cleaning device resulting in the brush and suction section missing contact with the work surface for a period of time as it will be at an awkward angle during this transition period. It is preferable for a mobile robotic cleaning device to finish cleaning a single surface type at a time before moving onto a different work surface type. With each cycle, the mobile robotic device will compile such data in order to assist with decision making during the next operational cycle.

Figure 1:
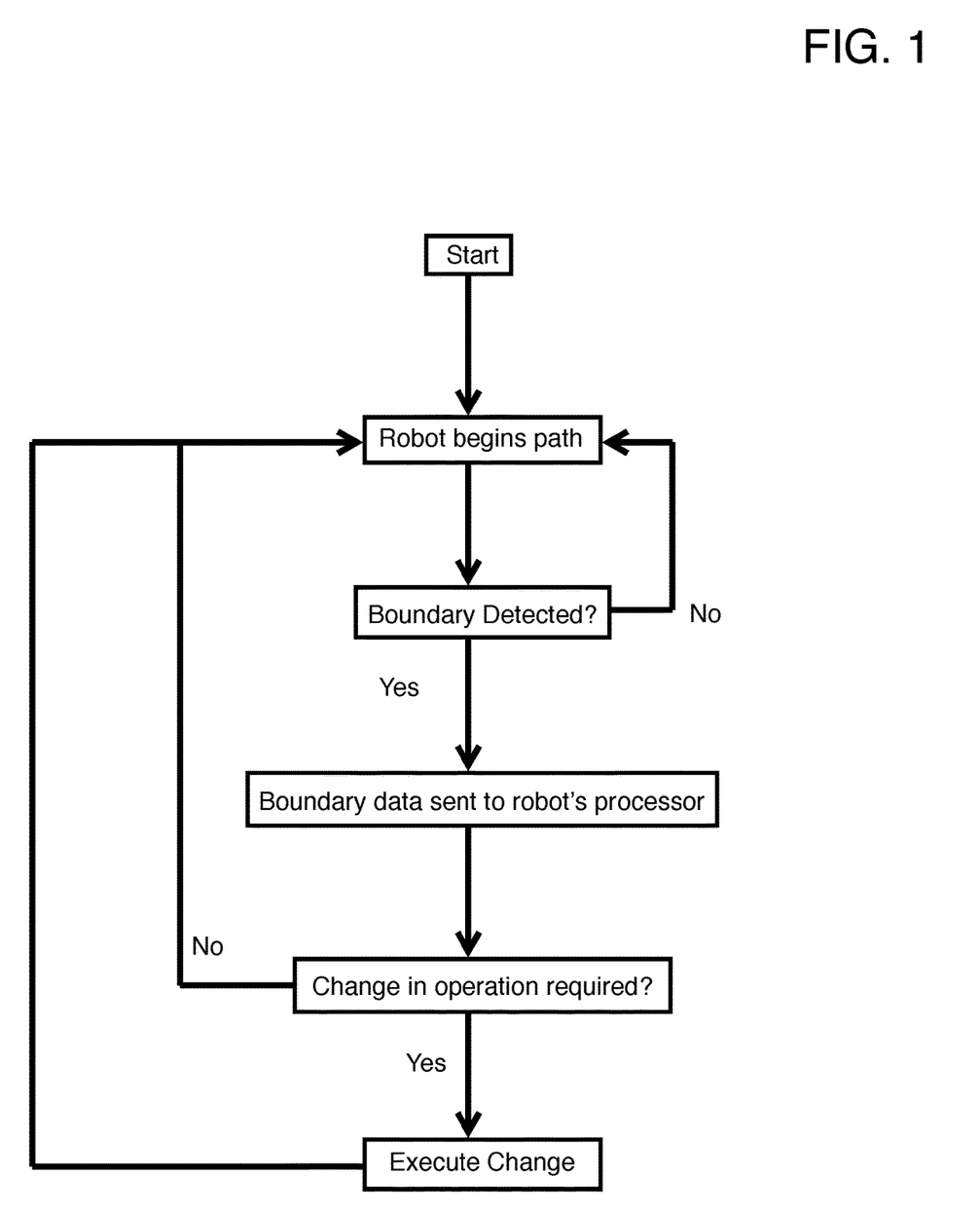
FIG. 1 illustrates the process by which a mobile robotic device detects a boundary edge between multiple work surface types and how it deals with the data collected.
Figure 2:
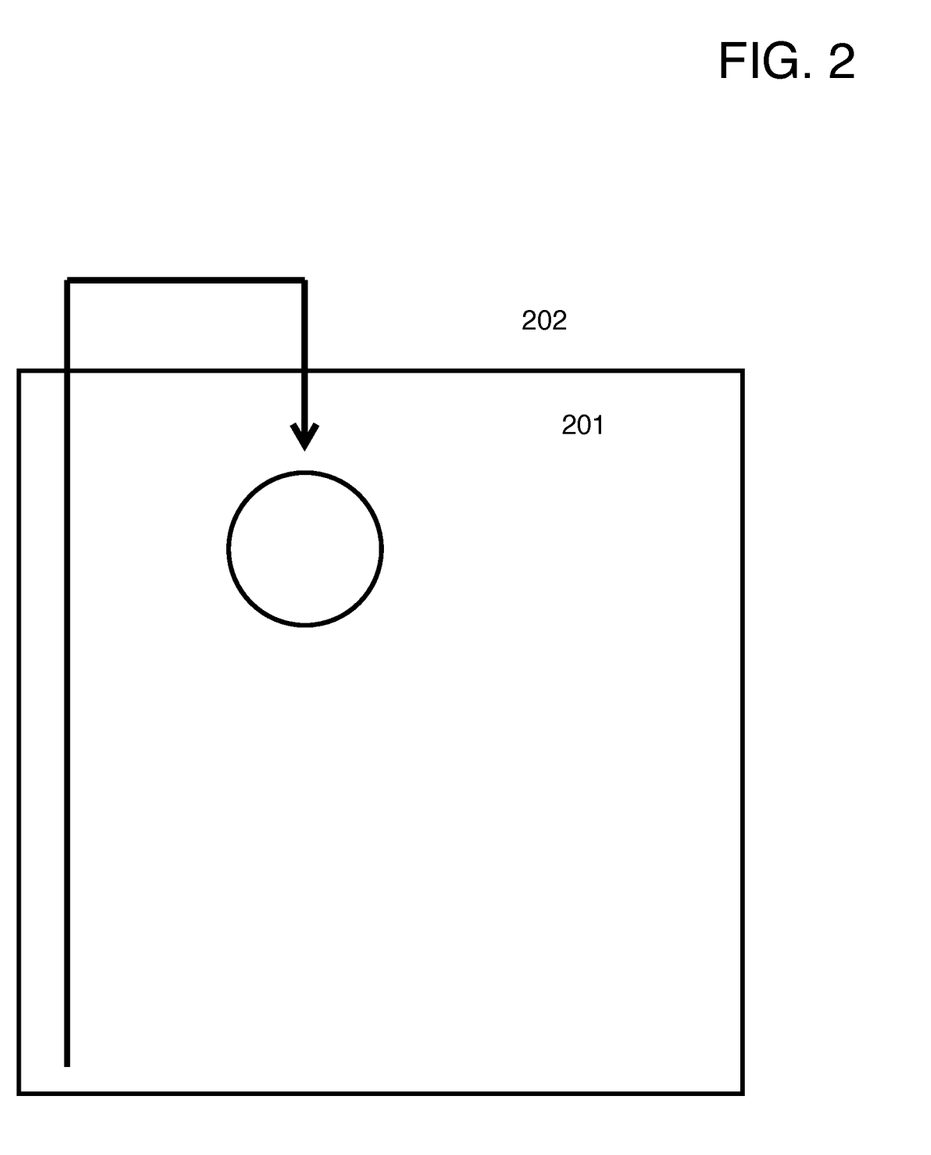
FIG. 2 illustrates an example of a mobile robotic device learning the boundary between two different work surface types.
Figure 3:
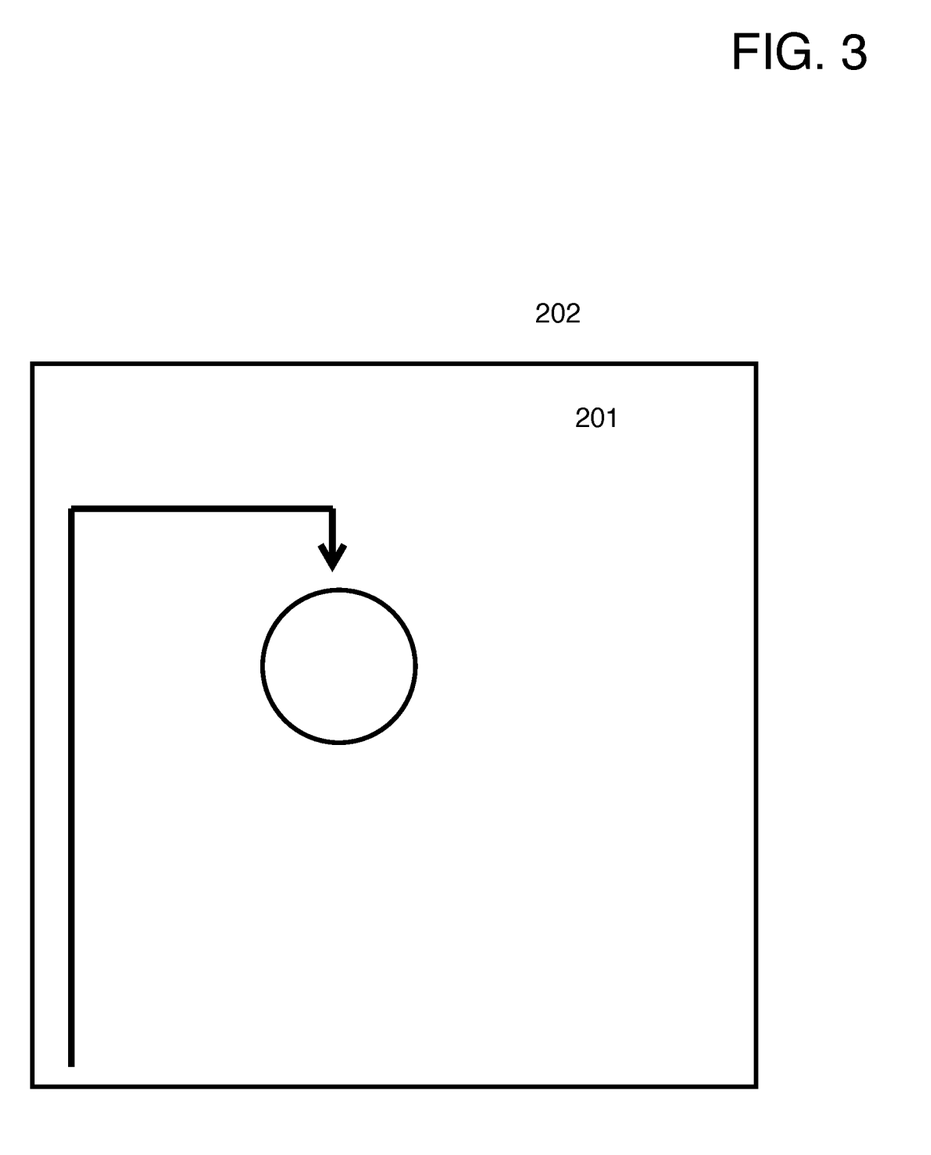
FIG. 3 illustrates an example of a mobile robotic device learning the boundary between two different work surface types.
Figure 4:
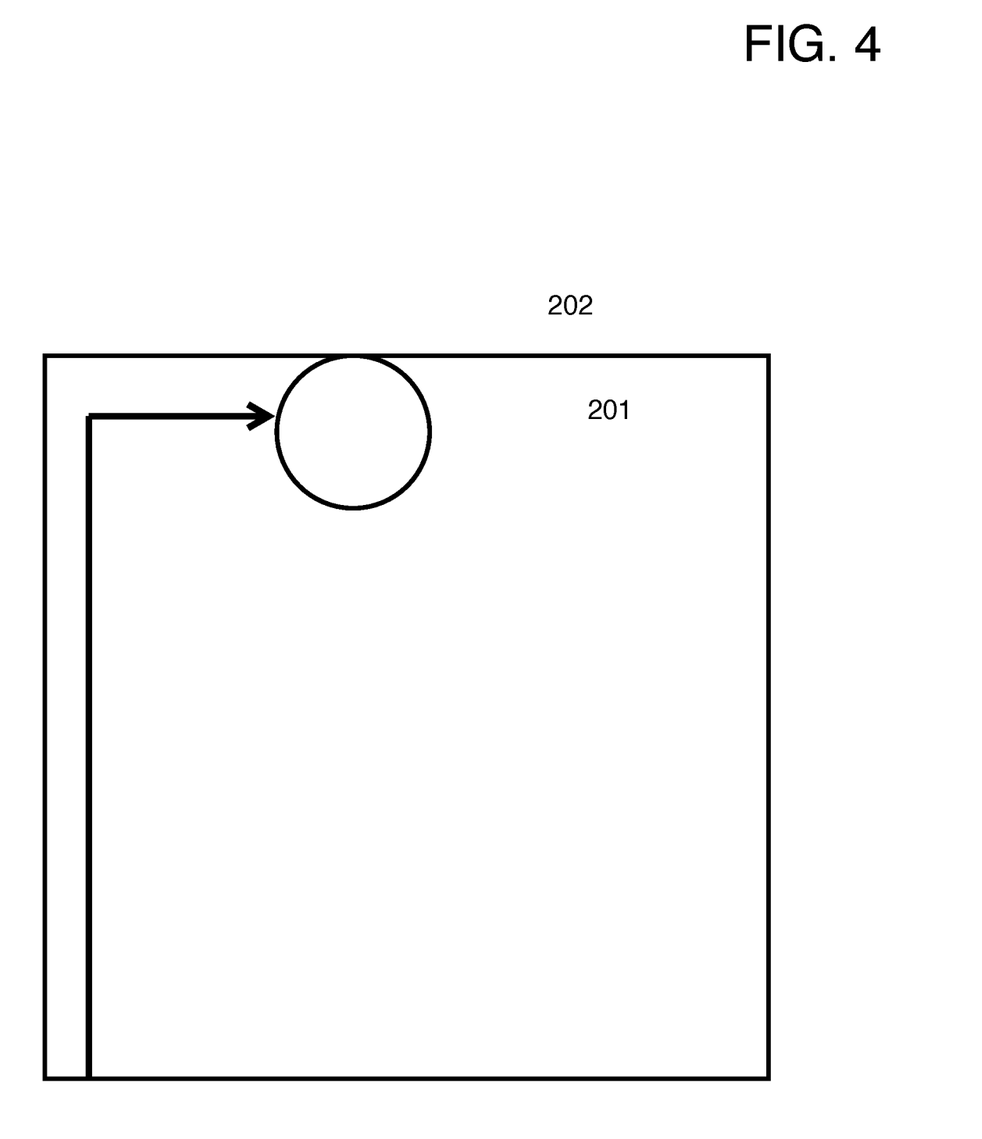
FIG. 4 illustrates an example of a mobile robotic device learning the boundary between two different work surface types.

In some embodiments, the mobile robotic device may assess that it should autonomously operate on a single work surface type at a time even if multiple surface types are present in the same work area. For example, for a mobile robotic cleaning device, the mobile robotic cleaning device may determine that it is preferable to operate on rug before transferring to a wood floor. Another example could be a mobile robotic device that carries items. The mobile robotic device may determine that it is preferable to operate on a single surface type if it is carrying delicate materials as alternating between different surface types may make the items it is carrying unstable and susceptible to breaking when the mobile robotic device encounters the elevation change between the different surface types at their boundary or edge. Whatever the situation, during the course of normal operation a mobile robotic device will learn the boundaries and edges between different work surface types. This process is demonstrated in FIG. 1. The mobile robotic device will learn these boundaries over a period of time as it makes multiple operational cycles in a given area. For example, as seen in FIG. 2 if a mobile robotic cleaning device is attempting to clean a rug 201 completely first in a room that sits on top of a wood floor 202 it may clean beyond the boundary of the rug and clean a small amount of the wood floor. It will learn where the boundary is and store this data. During the next cleaning cycle, after accessing the data from day 1, the mobile robotic cleaning device may once again clean beyond the boundary but the error margin may be smaller than on the first day. On a third day the mobile robotic cleaning device may clean too short of the boundary between the rug and wood floor, see FIG. 3. Ultimately all of this data will be compiled. On a fourth day the mobile robotic device may then get the boundary right and clean only the rug area but not on the wood floor see FIG. 4, or the mobile robotic device may completely clean one work surface type before transferring over to clean the second work surface type. The mobile robotic device will compile data from each cleaning cycle in order to assess probabilities about where it should clean. The days for a mobile robotic device to learn the boundaries and edges of work surfaces are not intended to be predetermined. They are to be machine learned and the mobile robotic device will learn them at the mobile robotic device's own individual pace.

Ultimately, a mobile robotic device will have a map it has autonomously generated based on the collected data of the work environment it has compiled over time. It will create and update the map with new data after each additional work cycle.

In some embodiments, in an environment where multiple mobile robotic devices are present, the mobile robotic devices may share information pertaining to the specific location, type of work surface, as well as internal maps generated, and historical operational data with each other. In some embodiments, the mobile robotic device will not need to learn the boundaries of work surfaces on its own as it will learn this information from the data shared from other mobile robotic devices. In some embodiments, the mobile robotic device will learn where the boundary edges are between surface types but will still need to confirm these during normal working operation. In alternative embodiments, the mobile robotic device will still need to autonomously learn the boundaries between varying work surface types on its own even after these boundaries have been shared by other mobile robotic devices.

In some embodiments a user may use an APP paired with the mobile robotic device. The user can thereafter diagram in a given work area roughly where different work surface types are located in order to assist the mobile robotic device with detecting such work surfaces. The mobile robotic device will thereafter anticipate a work surface change before it encounters it for that location in the room. However, the mobile robotic device will still need to autonomously learn the specific boundaries between varying work surface types.

Another aspect of the mobile robotic device operating at peak efficiency deals with interaction with dynamic obstacles. A mobile robotic device may act as a nuisance or safety hazard to dynamic obstacles such as a human, pet and may interfere with the operation of other mobile robotic devices. In such a situation it is undesirable for the mobile robotic device to operate in the same vicinity at such a time. Additionally, dynamic obstacles can interfere with the operation on the part of the mobile robotic device itself. Therefore, in order to operate at peak efficiency, the mobile robotic device will attempt to limit interaction with dynamic obstacles when in operation if the interaction will cause issues.

In embodiments, the device will mark the locations of obstacles including dynamic obstacles it has encountered in an internally generated map. Each time an obstacle is encountered the mobile robotic device will mark the location and nature of the obstacle on the internal map. Over time if an obstacle repeatedly appears the mobile robotic device may mark that obstacle as a permanent obstacle in the environment. In such a situation, the device will expect that obstacle to be present during work operation. In a situation where said obstacle is not present, the mobile robotic device may take note of the missing obstacle. If this repeatedly occurs then the mobile robotic device may mark the missing obstacle as a dynamic obstacle. Alternatively, in such a situation the mobile robotic device may expect the area to not have an obstacle at all and if one appears will mark the obstacle as dynamic. If such an obstacle appears on some occasions but not others the mobile robotic device may mark that obstacle as a dynamic obstacle. In some embodiments the mobile robotic device may mark obstacles that are unexpected, have disappeared or have unexpectedly appeared as dynamic obstacles.

In some embodiments, a mobile robotic device may encounter obstacles it has not encountered before in a location but which is close to where it routinely encounters obstacles. An example is a dining room chair. If the chair has been moved close from where it is usually located but not a large distance, for example a foot or so, then the mobile robotic device may anticipate that this is merely the same chair that has been slightly moved out of place. In such a situation the distance is not a predetermined distance but is up to the mobile robotic device to autonomously determine whether or not to label such an obstacle as dynamic or not.

In embodiments, when the mobile robotic device encounters dynamic obstacles that are moving, such as other mobile robotic devices, pets, humans and the like, the mobile robotic device will collect this data. The data collected may include but is not limited to what time this occurred, the date this occurred, where this occurred such as what room this occurred in, what was likely encountered such as whether this was a mobile robotic device, human, pet, piece of furniture or the like, and any other relevant information that the robot can utilize for cataloguing the encounter.

In embodiments, when the mobile robotic device encounters an obstacle that is invisible to it, for example an obstacle that the sensors on the mobile robotic device were not able to detect, the mobile robotic device may catalog that obstacle as a dynamic obstacle.

In some embodiments, in areas with multiple historical occurrences of dynamic obstacles, the mobile robotic device will expect such a location to be a high volume traffic location. In these situations, the mobile robotic device will have catalogued data in regards to when these instances occurred. For example, at 6 pm a mobile robotic device may encounter multiple humans in a kitchen or dining area on multiple occasions. In such a situation the mobile robotic device would internally note these encounters including information regarding the fact that it encountered multiple dynamic obstacles, that this occurred in the kitchen or dining area, that this occurred at 6 pm, and that this occurred on multiple occasions. The mobile robotic device would thereafter be able to rely on this information for future work cycles.

Figure 5:
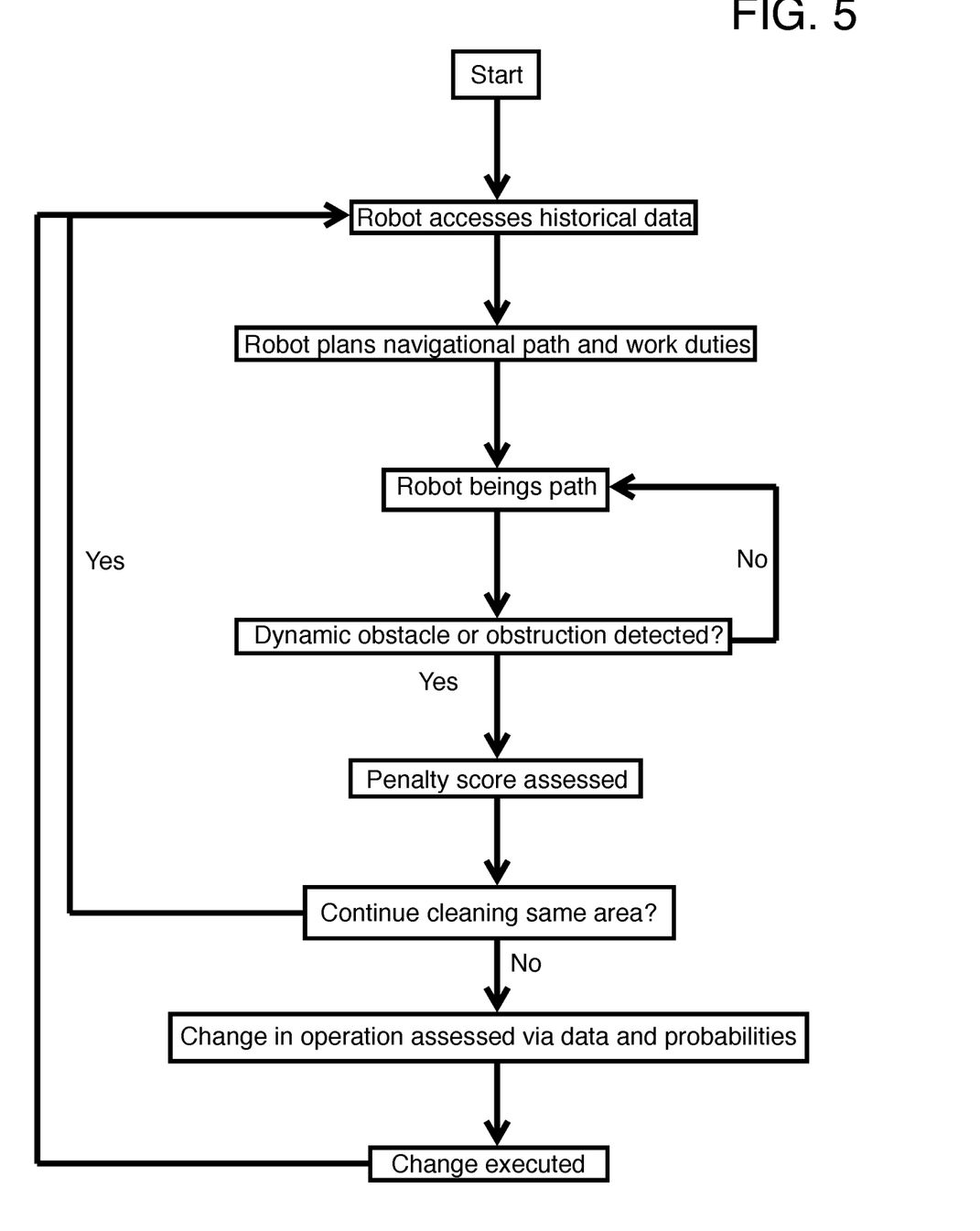
FIG. 5 illustrates how a mobile robotic device detects a dynamic obstacle in the work environment and the response process to such a detection.

In embodiments, the presence of dynamic obstacles over a period of time is measured. Utilizing machine learning, the mobile robotic device processes probabilities and a number between 1 and 10 is assessed as a penalty score to a given room or work area to aid in determining what area is preferable to clean first. For example, if the mobile robotic device encounters a dynamic obstacle such as multiple individuals in a room at the same time on a given day, it may assign a high penalty score for that room. At such a time the mobile robotic device will then leave this room and will attempt to operate job duties in a different room before returning to complete job duties in the room it previously assessed a high score for. On its way to or from the room with the high score, the mobile robotic device may encounter other rooms as well. When this occurs the mobile robotic device may check on these other rooms. If the mobile robotic device determines to check these other rooms, it will enter and assess whether or not it is an optimal time to perform job duties in these rooms based on the presence of dynamic obstacles. If a dynamic obstacle is encountered a penalty score may be assessed for this particular time on the particular day for this particular room. The mobile robotic device may then determine whether or not to conduct a work duty in that room or whether to move on to another room. Over a predetermined amount of time, the penalty scores for rooms that have been assessed a penalty will be reduced at a fixed rate over a fixed time interval. Additionally, the penalty scores for rooms that have been assessed a penalty will be reduced every time the mobile robotic device performs a work duty in a different room. When the mobile robotic device's penalty score for a particular room is lowered and reaches a predetermined low enough threshold the mobile robotic device will return to the room with the lowered score and attempt to perform work duties again in that room. The mobile robotic device may encounter other rooms on the way to the room with the lowered score and may attempt to perform job duties in those rooms first. If when the robot returns to the lowered score room it encounters enough dynamic obstacles that it believes it must leave the room again, the mobile robotic device will once again assess a penalty score for this room and continue on to additional rooms. FIG. 5 demonstrates the process by which a mobile robotic device deals with dynamic obstacles.

In some embodiments, the mobile robotic device may program itself to avoid areas where the historical data indicates the existence of a high volume of traffic or high likelihood of dynamic obstacles at the times it has noted have a tendency to have a high traffic volume or high likelihood of a dynamic obstacle being present. For example, for a mobile robotic cleaning device in a home, for a cleaning cycle running between 5 and 7 pm, the mobile robotic device may avoid the kitchen and dining areas around 6 pm as it will expect to encounter humans. Instead, at 6 pm the mobile robotic cleaning device may deem it better to clean an office, bedroom, or other low traffic volume areas before returning to clean the kitchen and dining areas at 7 pm when the humans are no longer present.

In some embodiments, a user may be able to let the mobile robotic device know via an APP paired with the mobile robotic device where items in a room are located. For example, for a dining area a user can mark where the table and chairs are located. In such a situation, when entering a given room, the mobile robotic device will anticipate such obstacles to be in the room and will not mark them as dynamic obstacles even if it has never encountered them before.

In some embodiments, a user may be able to let the mobile robotic device know via an APP paired with the mobile robotic device that humans, other mobile robotic devices, pets, or other dynamic obstacles are present in the area.

In some embodiments, in an environment where multiple mobile robotic devices are present, the mobile robotic devices may share information pertaining to the specific location, presence of dynamic obstacles, internal maps generated, and historical operational data with each other.

In embodiments, the work area map regarding locations of rooms and layout will play an important factor in regards to the peak efficiency for operation in regards to the mobile robotic device. Based on the location of rooms or map layout the device may determine that it should operate in particular rooms first as traveling to distant rooms would be burdensome and take time and battery life. For example, for a mobile robotic cleaning device, if it is determined that there is a high probability of a dynamic obstacle in a home office at a particular time but that there is a very low likelihood of a dynamic obstacle in bedroom 3, then the mobile robotic cleaning device may determine that it should clean bedroom 3. However, in a map layout, bedroom 3 may be several rooms away. Therefore in the interest of operating at peak efficiency, the mobile robotic cleaning device will attempt to clean the hallway and bedrooms 1 and 2 which are on the way to bedroom 3. In an alternative situation, if the mobile robotic cleaning device determines that on the way to bedroom 3 that the hallway and bedroom 1 have a low probability of a dynamic obstacle but that bedroom 2 has a medium probability of a dynamic obstacle then it may attempt to clean the hallway and bedroom 1 before checking on bedroom 2 to see if there is a dynamic obstacle present on the way to bedroom 3. In the same scenario, the mobile robotic device may simply determine to clean the hallway and bedroom 1 before skipping bedroom 2 on the way to cleaning bedroom 3. Once bedroom 3 has been cleaned the mobile robotic device may come back to check to see if bedroom 2 should be cleaned.

In embodiments, in order to maximize efficiency, the amount of battery power left may play a factor into what the mobile robotic device autonomously determines it should perform with regard to work tasks and navigation patterns. For example, for a mobile robotic cleaning device, if only one quarter battery life remains, the mobile robotic cleaning device may utilize this information for making determinations as to what work tasks should be performed. For example, if a mobile robotic cleaning device has the option of cleaning a hallway with a wood surface, or cleaning a large living room with multiple surface types, the mobile robotic cleaning device may determine based on battery power left that it would be optimal to completely clean the hallway and then recharge itself as the living room with multiple surface types would drain the battery to the point that the mobile robotic device would not be able to completely clean the room before charging. In some embodiments, the location of the mobile robotic device's docking or charging station may play a factor in the mobile robotic device's autonomous task decision making process. For example, if a mobile robotic device has multiple tasks assigned but it cannot complete all of them before it must recharge itself, the mobile robotic device may deem that the best actions to be completed are those nearest to the mobile robotic device's docking or charging station rather than those which are farther away.

In some embodiments, one factor which may impact the autonomous decision making on the part of a mobile robotic device is when tasks were last completed in a given room. For example, for a mobile robotic cleaning device, the fact that some rooms were cleaned several weeks ago while others were cleaned only a week ago may impact the decision making process for the mobile robotic device. In such a situation, a mobile robotic device may factor in and prioritize those work duties which have not been completed in quite some time over those that have been more recently completed.

In some embodiments a mobile robotic device may factor in the amount of activity that takes place in a given room. For example, for a mobile robotic cleaning device, if human activity takes place more often in the living room than in a home office, the mobile robotic cleaning device may prioritize cleaning the living room on a more consistent basis as it will get dirty more quickly. Additionally, in some embodiments, for a mobile robotic cleaning device, historical data pertaining to the amount of debris historically collected in various locations may be considered into the prioritization of cleaning particular rooms over others.

Additionally, once this data has been catalogued it may be made available to a user. A user, may thereafter be able to select what areas they would like a mobile robotic device to operate in and what actions a user would like the device to partake in.

With all of this information compiled over time, the mobile robotic device will work to come up with the most efficient navigational and work duty plan autonomously. The mobile robotic device will determine what rooms to operate in and what tasks to perform. For example, for a mobile robotic cleaning device the compiled data will impact what rooms to clean, how to navigate to them, what type of cleaning is to take place and when to clean them. The mobile robotic device will autonomously create a cleaning scheduling. Utilizing machine learning to process various probabilities, the scheduling will focus on achieving the most efficient manner for work tasks possible for the mobile robotic device. The data compiled over time will factor in various considerations regarding the work environment including work surface types, room locations, the presence or absence of dynamic obstacles, battery life and other relevant and the like data. The mobile robotic device will add data from each cleaning cycle. If new data emerges from a given cleaning cycle that is different from prior historical data, this may impact how the mobile robotic device operates in future work cycles.

While this invention has been described in terms of several embodiments, there are alterations, permutations, and equivalents, which fall within the scope of this invention. It should also be noted that there are many alternative ways of implementing the methods, devices and apparatuses of the present invention. Furthermore, unless explicitly stated, any method embodiments described herein are not constrained to a particular order or sequence. Further the Abstract is provided herein for convenience and should not be employed to construe or limit the overall invention, which is expressed in the claims. It is therefore intended that the following appended claims to be interpreted as including all such alterations, permutations, and equivalents as fall within the true spirit and scope of the present invention.

We claim:

1. A method for a mobile robotic cleaning devices to autonomously plan work duties in a work environment in a most efficient manner possible, the method comprising:
   accessing historical data stored from prior work cycles, the historical data being indicative of a type of work surface and a presence or absence of dynamic obstacles in a given work area;
   processing probabilities based on the historical data as to a most efficient navigational route and operational work duties for the mobile robotic cleaning device to partake in with one or more processors of the mobile robotic cleaning device;
   enacting the most efficient navigational route and operational work duties by the mobile robotic cleaning device;
   capturing new data by one or more sensors of the mobile robotic cleaning device while enacting the navigational route and operational work duties within the work environment;
   processing new data with the one or more processors of the mobile robotic cleaning device;
   assessing a penalty score for a work area within the work environment when a dynamic obstacle is detected in the work area with the one or more processors; and
   enacting a new most efficient navigational route and operational work duties by the mobile robotic cleaning device when discrepancies exist between the new data and the historical data.

2. The method of claim 1 wherein the one or more processors of the mobile robotic cleaning device autonomously determines that the most efficient cleaning manner is to clean one work surface type at a time before cleaning a different work surface type.

3. The method of claim 2 wherein the mobile robotic cleaning device thereafter cleans one work surface type at a time completely before cleaning a second work surface type.

4. The method of claim 1 wherein the one or more processors of the mobile robotic cleaning device monitors the presence or absence of dynamic obstacles in the work environment.

5. The method of claim 4 wherein when a dynamic obstacle is detected, the one or more processors of the mobile robotic cleaning device collects data regarding the location this encounter occurred at, the time this encounter took place, the date of the encounter, and type of dynamic obstacle encountered.

6. The method of claim 1 wherein the one or more processors of the mobile robotic cleaning device autonomously determines to perform work duties in a different work area upon detecting the presence of a dynamic obstacle in a given work area.

7. The method of claim 1 wherein the one or more processors of the mobile robotic cleaning device autonomously determines based on processed probabilities that it is likely to encounter a dynamic obstacle in a work area and should therefore perform work duties in a different area where a presence of a dynamic obstacle is unlikely.

8. The method of claim 7 wherein after cleaning the work area the mobile robotic cleaning device thereafter checks other work areas where there have been a historical presence of a dynamic obstacle to determine when to clean those work areas.

9. The method of claim 1 wherein when a penalty score is assessed for the work area, the mobile robotic device will not conduct work duties or navigate to that area until the penalty score has reached a predetermined threshold.

10. The method of claim 1 wherein the penalty score assessed for the work area decreases at a fixed rate over a fixed time interval.

11. The method of claim 1 wherein the penalty score assessed for the work area decreases every time the mobile robotic device performs work duties in a different work area.

12. The method of claim 1 wherein the one or more processors of the mobile robotic cleaning device creates an internal map of the work environment with specific markers on the map marking the location of different work surface types and dynamic obstacles detected during operation.

13. The method of claim 1 wherein the new data consists of the mobile robotic cleaning device autonomously learning the boundaries or edges between different work surface types during operation.

14. The method of claim 13 wherein the one or more processors of the mobile robotic cleaning device learns the boundaries or edges between different work surface types from other mobile robotic devices.

15. The method of claim 1 wherein the layout of an entire work area contributes to the consideration of a mobile robotic cleaning device determining what constitutes the most efficient navigational route and operational work duties.

16. The method of claim 1 wherein the amount of battery power left is a contributing factor to the one or more processors of a mobile robotic cleaning device determining what constitutes the most efficient navigational route and operational work duties.

17. The method of claim 1 wherein the one or more processors of the mobile robotic cleaning device learns of a presence of a current dynamic obstacle in a work area from data shared by another mobile robotic device.

18. The method of claim 1 wherein the one or more processors of the mobile robotic cleaning device learns of a historical presence of a dynamic obstacle in a work area from historical data shared by another mobile robotic device.

19. The method of claim 1 wherein the mobile robotic device is a mobile robotic device other than a mobile robotic cleaning device.

20. The method of claim 1 wherein the penalty score quantifies the preference of cleaning the work area, wherein the preference is based on at least the presence of dynamic obstacles within the work area.

* * * * *